United States Patent
Bender et al.

(10) Patent No.: US 10,208,389 B2
(45) Date of Patent: Feb. 19, 2019

(54) METHODS AND SYSTEMS FOR REDUCING IMPURITY METAL FROM A REFINERY ELECTROLYTE SOLUTION

(71) Applicant: BASF SE, Ludwigshafen (DE)

(72) Inventors: Jack Bender, Corona de Tucson, AZ (US); Nathan C. Emmerich, Tucson, AZ (US)

(73) Assignee: BASF SE, Ludwigshafen (DE)

( * ) Notice: Subject to any disclaimer, the term of this patent is extended or adjusted under 35 U.S.C. 154(b) by 248 days.

(21) Appl. No.: 14/846,142

(22) Filed: Sep. 4, 2015

(65) Prior Publication Data

US 2017/0058416 A1    Mar. 2, 2017

Related U.S. Application Data

(63) Continuation-in-part of application No. 14/836,370, filed on Aug. 26, 2015.

(51) Int. Cl.
| | |
|---|---|
| *C25C 7/00* | (2006.01) |
| *C25C 7/06* | (2006.01) |
| *C25C 1/12* | (2006.01) |
| *C22B 3/20* | (2006.01) |
| *C22B 15/00* | (2006.01) |

(52) U.S. Cl.
CPC .............. *C25C 7/06* (2013.01); *C22B 3/0004* (2013.01); *C22B 15/0067* (2013.01); *C25C 1/12* (2013.01); *Y02P 10/234* (2015.11); *Y02P 10/236* (2015.11)

(58) Field of Classification Search
CPC . C25C 7/06; C25C 1/12; C22B 3/0068; Y02P 10/234; Y02P 10/236; Y02P 10/238
USPC .............. 423/87, 89, 139; 205/586; 210/634
See application file for complete search history.

(56) References Cited

U.S. PATENT DOCUMENTS

| | | | |
|---|---|---|---|
| 4,061,564 A | 12/1977 | De Schepper et al. | |
| 4,067,802 A | * 1/1978 | Cronberg | C22B 3/0095 205/586 |
| 4,115,512 A | 9/1978 | Kerfoot | |
| 4,157,946 A | 6/1979 | Hyvarinen | |
| 4,334,999 A | 6/1982 | Cornwell | |
| 4,444,666 A | 4/1984 | Hiroshi et al. | |
| 4,560,453 A | 12/1985 | Hoffman et al. | |
| 4,789,444 A | * 12/1988 | Watanabe | C25C 1/00 205/572 |
| 4,820,417 A | 4/1989 | Buchmeier et al. | |
| 4,834,951 A | 5/1989 | Schwab et al. | |
| 4,957,714 A | 9/1990 | Olafson et al. | |
| 5,039,496 A | 12/1991 | Kehl et al. | |
| 5,093,090 A | 3/1992 | Guerriero et al. | |
| 5,133,948 A | 7/1992 | King et al. | |
| 5,366,715 A | 11/1994 | Dreisinger et al. | |
| 5,573,739 A | 11/1996 | Baboudjian et al. | |
| 5,582,737 A | 12/1996 | Gula et al. | |
| 5,632,963 A | 5/1997 | Schwab et al. | |
| 5,783,057 A | 7/1998 | Tomita et al. | |
| 5,948,264 A | 9/1999 | Dreisinger et al. | |
| 8,349,187 B2 | 1/2013 | Riveros | |
| 2006/0144717 A1 | 7/2006 | Marsden et al. | |

FOREIGN PATENT DOCUMENTS

| | | |
|---|---|---|
| DE | 30 12 246 | 10/1980 |
| EP | 562709 | * 9/1993 |
| EP | 2386377 | * 11/2011 |
| WO | 91/16465 | 10/1991 |
| WO | 97/44499 | 11/1997 |
| WO | 2015/132654 | 9/2015 |

OTHER PUBLICATIONS

Dreisinger et al, "Recent advances in the solvent extraction . . . copper refinery electrolytes" 24th Annual Hydrometallurgical Meeting, Proc. Int. Symp. on impurity control and disposal in Hydro. Processes, pp. 71-88, Toronto, Canada, Aug. 21-24, 1994. (Year: 1994).*
Levin et al., "Concentration and separation of indium . . . alkylphosphoric acids" Talanta, 1967, 14(7), pp. 801-808. (Year: 1967).*
CYANEX 272 Extractant Product Sheet, *CYTEC* 2008, 16 pages.
CYANEX 923 Extractant Product Sheet, *CYTEC* 2008, 16 pages.
Demopoulos, G.P., Bench Scale and Mini-Pilot Plant Investigations on the Selective Removal of Iron from Zinc Process Solutions by Solvent Extraction, *Iron Control and Disposal* 1996, 395-416.
Demopoulos, G.P., et al., Iron(III) Removal From Base-Metal Electrolyte Solutions by Solvent Extraction, *Hydrometallurgy*, vol. 12 1984, 299-315.
Dreisinger, D.B., et al., The Solvent Extraction and Ion Exchange Removal of As, Sb, and Bi from Copper Sulphate-Sulphuric Acid Solutions, *Hydrometallurgy* 1999, 802-815.

(Continued)

*Primary Examiner* — Steven J Bos
(74) *Attorney, Agent, or Firm* — Lowenstein Sandler LLP

(57) ABSTRACT

Disclosed are methods for the reduction of impurity metals from a refinery electrolyte solution. Certain methods comprise contacting a refinery electrolyte solution comprising an impurity metal with a phosphate ester having a structure represented by:

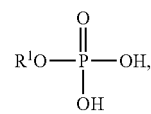

wherein $R^1$ comprises a linear, branched or cyclic alkyl or aryl group, and wherein the impurity metal is selected from the group consisting of iron, antimony, arsenic, bismuth, tin and combinations thereof.

20 Claims, 1 Drawing Sheet

(56) References Cited

OTHER PUBLICATIONS

Ismael, M.R.C., et al., Iron Recovery From Sulphate Leach Liquors in Zinc Hydrometallurgy, *Materials Engineering* vol. 16 2003, 31-39.
Principe, F.T., et al., Solvent Extraction Removal of Iron from Zinc Process Solutions Using Organophosphorus Extractants, *The Minerals, Metals & Materials Society* 1998, 267-287.
Xue, S.S., et al., Control of iron in copper electrolyte streams with a new monophosphonic/sulphonic acid resin, *Minerals & Metallurical Processing*, vol. 18 No. 3 Aug. 2011, 133-137.

\* cited by examiner

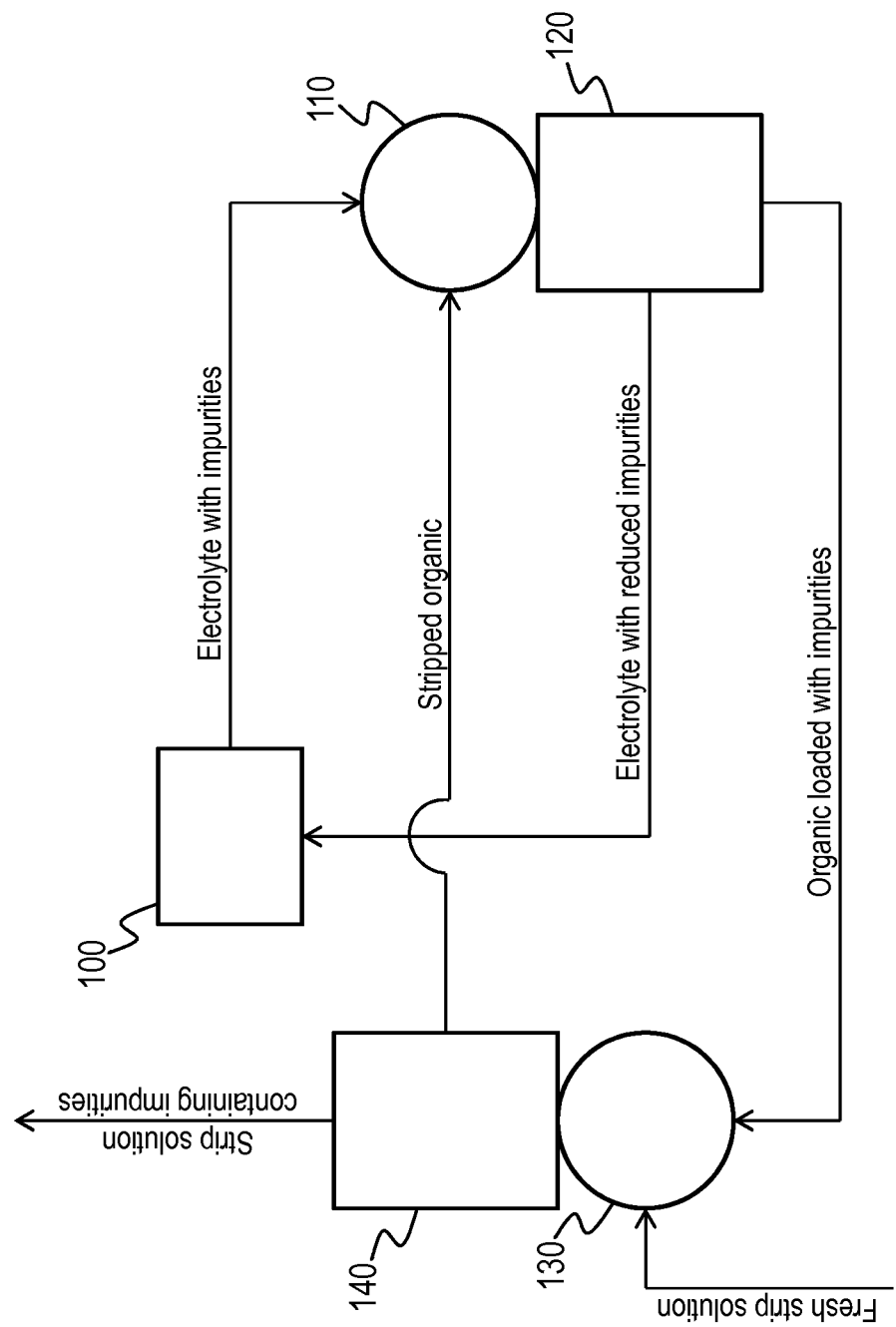

METHODS AND SYSTEMS FOR REDUCING IMPURITY METAL FROM A REFINERY ELECTROLYTE SOLUTION

CROSS-REFERENCE TO RELATED APPLICATIONS

This application is a continuation-in-part (CIP) of U.S. application Ser. No. 14/836,370, filed Aug. 26, 2015, the entire contents of which is incorporated herein by reference.

TECHNICAL FIELD

The present invention relates generally to the field of extractive metallurgy. In particular, the present invention relates to methods for the impurity metal content from electrolytic solutions produced during refinery processes.

BACKGROUND

The importance of copper, as well as a variety of other metals, has led to a continuing search for more efficient and productive procurement methods.

One method of generating high purity copper is pyrometallurgical processing. However, pyrometallurgical processing and purification of metal ores, including copper, inevitably leads to a variety of impurities within the product due to the inherent limitations of the method. Therefore, the initial products must be subject to further purification as a result of the admixed impurities. Additional processes are necessary to bring the crude product to the desired purity standards.

The majority of commercial copper is produced by pyrometallurgical processes, for example smelting. In fact, over seventy percent of the copper metal produced comes from the smelting of copper sulfide concentrates. After the copper is isolated from the copper sulfide concentrates, the copper is cast into copper anodes. These anodes contain a variety of metal impurities that are soluble in the molten copper. At this point, the copper is approximately 99%. However, for some industries, such as wire and electrical operations, the purity of the copper must be at least 99.99%. Moreover, aside from the overall purity of copper, some impurities in particular must be kept to a minimum. For example, bismuth present even in only the ppb can make copper too brittle to pull wire. As with other metals, smelting alone is insufficient to generate high purity copper. Precious metals, nickel, lead, iron, selenium, tellurium, arsenic, antimony, tin, and bismuth are potentially found in this crude copper ("blister"), depending on the ore being treated, and thus further refining is required.

A method to increase the purity of copper is to electrolytically transfer the copper from copper anode sheets to cathode as cathodic copper. As part of the process, the impurities in the anodic copper sheet are dissolved in the electrolyte, or fall to the bottom of the cell as sludge. The build-up of these impurities in the solution causes an issue, as the electrolyte is entrained in the copper cathode sheet as part of the process, thus impregnating the copper sheet with unwanted metal species.

One of the most widely used methods to remove impurities from the "blister" is electrolytic refining. In electrorefining, the blister is re-melted and poured into sheets. These sheets function as the anode of an electrolytic cell, which dissolve and eventually re-plate as the final copper cathodic product. The majority of impurities in the copper anode form an insoluble "slime" on the surface of the electrode or fall to the bottom of the cell. However some impurities, in particular antimony, tin and bismuth, dissolve into the acidic copper electrolyte and can be incorporated into the cathode by numerous mechanisms. These impurities deteriorate cathode quality resulting in concerns for negative downstream processing (e.g., drawing copper wire). Due to the significant economic impact of electrolyte impurities, copper producers go to great lengths to mitigate any and all factors that negatively impact operating costs and/or the quality of the final product.

A common tactic for ensuring a high purity product is to control the concentration of unwanted metals such as bismuth, tin, and antimony in the electrolyte which rapidly increase over time if left unchecked. Typically, the concentrations are maintained at 0.3-0.5 g/L (e.g., bismuth and antimony) in the acidic electrolyte, but when concentrations approach a critical limit, a stream of electrolyte is bled, treated and eventually returned to the cells.

Several methods have been investigated for the removal of the aforementioned impurity metals. Among the variety of methods available for removal of antimony, tin, and bismuth, one option is ion exchange. However, reagent consumption in this method is high, making it a costly and inefficient option. Another option involves precipitation of the unwanted metals. However, this treatment requires altering various characteristics of solution (e.g., acid concentration). This requires additional reagent, and the resulting solution cannot be returned to the electrorefining process due to changes in the solution characteristics (e.g., too acidic). It may also be necessary to recover the copper values before treatment via precipitation. Further options include the electrowinning of the impurities. However this method typically requires the copper be electrowon from the bleed stream and sent back for reprocessing before any other contaminants can be removed from solution. There is thus a need for methods that address one or more of these problems.

SUMMARY

One aspect of the invention pertains to a method of reducing impurity metal from a refinery electrolyte solution. In one or more embodiments, the method comprises contacting a refinery electrolyte solution comprising an impurity metal with a phosphate ester having a structure represented by:

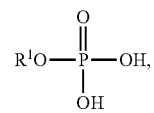

wherein $R^1$ comprises a linear, branched or cyclic alkyl or aryl group, and wherein the impurity metal is selected from the group consisting of iron, antimony, arsenic, bismuth, tin and combinations thereof. In one or more embodiments, $R^1$ in the phosphate ester is a branched or linear C6-C18 alkyl group. In some embodiments, the phosphate ester comprises iso-octyl phosphoric acid, 2-ethylhexyl phosphoric acid, octophenyl phosphoric acid or nonylphenyl phosphoric acid. In one or more embodiments, the phosphate ester comprises iso-octyl phosphoric acid or a C12 alkyl phenylphosphoric acid.

In some embodiments, the method further comprises contacting the refinery electrolyte solution comprising an impurity metal with a di-substituted phosphate ester. In one or more embodiments, the method further comprises contacting the electrolyte solution with a solubility modifier. In some embodiments, the method further comprises contacting the electrolyte solution with a kinetic modifier. In one or more embodiments, the impurity metal is selected from the group consisting of bismuth, antimony, tin and combinations thereof.

Another aspect of the invention pertains to a method of reducing impurity metal from a refinery electrolyte solution. In some embodiments, the method comprises
a. bleeding a stream of electrolyte solution with impurities from a refinery process, the electrolyte solution with impurities comprising an impurity metal selected from the group consisting of iron, antimony, arsenic, bismuth, tin and combinations thereof; and
b. mixing the electrolyte solution with impurities with a stripped organic solution to provide a loaded organic solution containing at least a portion of the impurities and electrolyte solution with reduced impurities, wherein the stripped organic solution comprises a phosphate ester having a structure represented by:

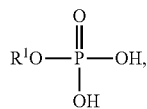

wherein $R^1$ comprises a linear, branched or cyclic alkyl or aryl group.

In one or more embodiments, $R^1$ in the phosphate ester is a branched or linear C6-C12 alkyl group. In some embodiments, the impurity metal is selected from the group consisting of bismuth, antimony, tin and combinations thereof, the phosphate ester comprises iso-octyl phosphoric acid, 2-ethylhexyl phosphoric acid, octophenyl phosphoric acid or nonylphenyl phosphoric acid. In one or more embodiments, the phosphate ester comprises iso-octyl phosphoric acid. In some embodiments, the phosphate ester comprises phenylphosphoric acid.

In one or more embodiments, the method further comprises mixing the loaded organic solution with a strip solution to provide a strip solution containing impurity metal and stripped organic. In some embodiments, the stripped organic is mixed with fresh electrolyte solution with impurities. In one or more embodiments, the strip solution containing the impurity metal is reused to be mixed with additional loaded organic solution. In some embodiments, the method further comprises returning the electrolyte solution with reduced impurities to the refinery process. In one or more embodiments, mixing the electrolyte solution with impurities with a stripped organic solution comprises mixing in a mixing tank to provide an emulsion of the loaded organic solution and electrolyte solution with reduced impurities. In some embodiments, the method further comprises separating the loaded organic solution and electrolyte solution with reduced impurities in a settler.

A third aspect of the invention pertains to a method of reducing impurity metal from a refinery electrolyte solution. In one or more embodiments, the method comprises
a. bleeding a stream of electrolyte solution with impurities from a copper refinery process, the electrolyte solution with impurities comprising an impurity metal selected from the group consisting of iron, antimony, arsenic, bismuth, tin and combinations thereof;
b. mixing in a mixing tank the electrolyte solution with impurities with a stripped organic solution to provide an emulsion comprising a loaded organic solution containing at least a portion of the impurities and electrolyte solution with reduced impurities, wherein the stripped organic solution comprises a phosphate ester having a structure represented by:

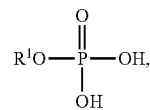

wherein $R^1$ comprises a linear, branched or cyclic alkyl or aryl group;
c. separating the loaded organic solution and electrolyte solution with reduced impurities in a settler;
d. returning the electrolyte with reduced impurities to the copper refinery process;
e. mixing in a mixing tank the loaded organic solution and a strip solution to provide an emulsion comprising a strip solution containing the impurity metal and stripped organic; and
f. separating the strip solution containing the impurity metal and stripped organic.

BRIEF DESCRIPTION OF THE DRAWINGS

The FIGURE shows an exemplary plant schematic according to one or more embodiments of the invention.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Pyrometallurgical processing and purification of metal ores, including copper, inevitably leads to a variety of impurities within the product due to the inherent limitations of the purification methods. Therefore, the initial products must be subject to further purification as a result of the admixed impurities. Additional processes are necessary to bring the crude product to the desired purity standards.

Aspects of the invention provide a process for directly treating a bleed stream of electrolyte solution with particular extractants to selectively remove contaminants, in particular bismuth, tin, and antimony. In some embodiments, this is achieved via a small solvent extraction plant without any pretreatment of the electrolyte to recover copper or other metals. In one or more embodiments, methods described herein allow for selective removal of unwanted metals without binding desired metals, such as copper. This feature allows for limited reprocessing of copper, and allows the electrolyte to be directly returned to the electrorefining cells. Additionally, one or more methods described herein allow for removal of single metals or a variety of metals in the same stage, giving more control to the operator.

Accordingly, a first aspect of the invention pertains to a method of reducing impurity metal from a refinery electrolyte solution, the method comprising contacting a refinery electrolyte solution comprising an impurity metal with a phosphate ester having a structure represented by:

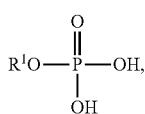

wherein R¹ comprises a linear, branched or cyclic alkyl or aryl group, and wherein the impurity metal is selected from the group consisting of iron, antimony, arsenic, bismuth, tin and combinations thereof. The phosphate ester (also referred to as a acid phosphate or phosphoric acid), features substitution of one of the hydrogens on phosphoric acid (i.e. mono-substituted). In one or more embodiments, the compound may be a monoalkyl phosphate ester. In embodiments wherein the R¹ group is aryl, the aryl groups may be substituted.

As used herein, "impurity metal" or "impurity" refers to undesired metals present in a refinery electrolyte solution. In one or more embodiments, the impurity metal is selected from the group consisting of iron, antimony, arsenic, bismuth, tin and combinations thereof. The impurity metal is distinguished from the desired metal. In some embodiments, the desired metal is copper. Thus, in one or more embodiments, the methods described herein reduce impurity metals from copper refinery electrolytic solutions. In some embodiments, the methods allow for retrieval of copper that is 99.99% pure.

The electrolyte solution containing dissolved impurity metal values may be contacted with the water-immiscible organic solution comprised of a hydrocarbon solvent as described herein and one or more extraction agents described herein for a period of time sufficient to allow the extractant agents to form a complex with the metal impurity ions. The electrolyte solution can be contacted by the organic solution in any manner that brings the two immiscible phases together for a period of time sufficient to allow the extraction agents to form a complex with the impurity metal ions. This includes shaking the two phases together in a separatory funnel or mixing the two phases together in a mix tank as described in U.S. Pat. No. 4,957,714, the entire contents of which are incorporated herein by reference.

The phosphate ester is used as an extractant for the one or more impurity metals. In one or more embodiments, R¹ is a branched or linear C6 to C12, C14 or C18alkyl group. In general, it is thought that any monoalkyl, aryl or alkyl-substituted aryl group (e.g., iso-octylphenyl) of phosphoric acid may be used provided it contains a sufficient number of carbon atoms to maintain solubility in a hydrocarbon diluent. In further embodiments, R¹ is a branched or linear $C_6$-$C_9$ group. The one or more alkyl groups may be hexyl, heptyl, octyl, nonyl, decyl, undecyl or dodecyl. One or more of the isomers of these alkyl groups may also be used. In one or more embodiments, the extraction agent comprises iso-octyl (i.e. mixed branched octyl), nonylphenyl or phenyl. In some embodiments, the phosphate ester comprises iso-octyl phosphoric acid, 2-ethylhexyl phosphoric acid, octophenyl phosphoric acid, nonylphenyl phosphoric acid, or phenyl-phosphoric acid. In some embodiments, R¹ is an aryl group. As used herein, "aryl" includes aromatic groups with substitutions (e.g., alkyl substituted aryl groups). In further embodiments, the phosphate ester comprises an alkyl phenylphosphoric acid. In yet further embodiments, the phosphate ester comprises a C6-C12 alkyl phenylphosphoric acid, or more particularly a C12 alkyl phenylphosphoric acid.

Often times (due to constraints imposed by synthesis and purification methods of the phosphate ester), phosphate esters usually comprise mixtures of mono- and di-substituted possibly tri-substituted phosphate esters. Thus, in one or more embodiments, the refinery electrolyte solution may be contacted with more than one component. For example, in some embodiments, the extraction agent may comprise mixtures of mono-, di-, and/or tri-substituted phosphate esters.

In further embodiments, the extraction agent may further comprise a di-substituted phosphate ester. In some embodiments, the mono- and di-substituted phosphate esters are present in a molar ratio of about 20:1 to about 0.1:1, about 10:1 to about 0.2:1, or about 5:1 to about 0.2:1 0.5:1. In one or more embodiments, the extraction agent further comprises a tri-substituted phosphate ester. In further embodiments, the trialkyl phosphate ester is selected from the group consisting of tributyl phosphate, trihexyl phosphate ester, trioctyl phosphate ester, and tripentyl phosphate ester.

In some embodiments, the phosphate ester is part of an organic phase. The phosphate esters may be dissolved in a solvent and/or diluent. Solvents and/or diluents commonly used in the mining fields may be used. In some embodiments, the solvent and/or diluent comprises a water immiscible organic solvent that will solubilize extractants and modifiers. In further embodiments, the water immiscible organic solvent is selected from the group consisting of kerosene, benzene, toluene, xylene and combinations thereof. Diluents with higher aromatic contents are due to the higher solubility of the extractant metal complex. In one or more embodiments, the amount of phosphate ester in an organic phase can vary from about 0.01 M to about 3.8 M, or more particularly from about 0.1 M to about 1.5 M.

In one or more embodiments, the phosphate ester may be accompanied by an additive, which can help to keep the extraction agent soluble and/or to aid in the stripping reaction (termed a "modifier"). That is, the method may further comprise contacting the refinery electrolyte solution with a modifier. In further embodiments, the modifier and phosphate ester are present together in a mixture. Such modifiers may be useful as a solubility, kinetic and/or thermodynamic modifier. Traditionally, solubility modifiers add polarity to the organic phase so that the complex remains soluble in the organic phase. Thus, the solubility, kinetic and/or thermodynamic modifiers contact the electrolyte solution in the presence of the phosphate ester. A thermodynamic modifier will impact the extraction and stripping of the extractant. In some embodiments, the modifier may have qualities as both a thermodynamic and solubility modifier. In some embodiments, modifiers are present in the organic phase at a concentration ranging from about 0 to about 5 M, or more particularly about 0.25 M to about 1.25 M.

In some embodiments, the additive comprises a long chain alcohol. In one or more embodiments, $C_8$-$C_{16}$ linear, branched or cyclic or aryl alcohol. In further embodiments, the modifier comprises a $C_{10}$-$C_{13}$ linear, branched or cyclic or aryl alcohol. In yet further embodiments, wherein the modifier comprises isotridecanol (also known as tridecanol or TDA) or isodecanol. In one or more embodiments, the organic comprises an additive and additional phosphate esters, including di- or tri-substituted phosphate esters. Examples of suitable tri-substituted phosphate esters include, but are not limited to, tributyl phosphate, trihexyl phosphate ester, trioctyl phosphate ester, and tripentyl phosphate ester.

In one or more embodiments, the source of the refinery electrolyte solution is a bleed stream of electrolyte solution with impurities, which is bled from a refinery process. In one or more embodiments, the electrolyte solution may be withdrawn from a refinery process or circuit. That is, the electrolyte solution may be taken from a refinery apparatus. Alternatively, electrolyte solution may be taken from lines leading either into or out of the refinery apparatus. In some embodiments, aqueous electrolyte solution may be continuously taken from the refinery apparatus and/or process. For example, a bleed line may be taken from either the input, output or the refinery apparatus itself.

Accordingly, another aspect of the invention pertains to a method of reducing impurity metal from a refinery electrolyte solution, the method comprising:
  a. bleeding a stream of electrolyte solution with impurities from a refinery process, the electrolyte solution with impurities comprising an impurity metal selected from the group consisting of iron, antimony, arsenic, bismuth, tin and combinations thereof; and
  b. mixing the electrolyte solution with impurities with a stripped organic solution to provide a loaded organic solution containing at least a portion of the impurities and electrolyte solution with reduced impurities, wherein the stripped organic solution comprises a phosphate ester having a structure represented by:

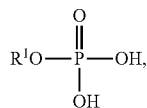

wherein $R^1$ comprises a linear, branched or cyclic alkyl or aryl group.

Variations in phosphate ester choice and concentrations can be selected as described above. Thus, for example, in one or more embodiments, $R^1$ in the phosphate ester is a branched or linear C6-C12 alkyl group. In some embodiments, the phosphate ester comprises iso-octyl phosphoric acid, 2-ethylhexyl phosphoric acid, octophenyl phosphoric acid, nonylphenyl phosphoric acid, or phenylphosphoric acid.

Once the electrolyte solution has been mixed with the phosphate ester, the amount of impurities in the electrolyte solution is reduced. This electrolyte solution can be returned to the refinery process. That is, in some embodiments, the method further comprises returning the electrolyte solution with reduced impurities to the refinery process. In one or more embodiments, it is desirable to move the impurities back into the aqueous phase. Thus, in some embodiments, the method further comprises mixing the loaded organic solution with a strip solution to provide a strip solution containing impurity metal and stripped organic. This stripped organic can be re-used to extract more impurities from electrolyte solution. That is, in one or more embodiments, the stripped organic is mixed with fresh electrolyte solution with impurities. In some embodiments, the strip solution containing impurity metal can be reused to be mixed with additional loaded organic solution. That is, the strip solution can be recycled and used to remove additional impurity. The impurities can build up in the strip solution over time, until a desired maximum or level is reached.

Mixing of the electrolyte solution with stripped organic solution can be achieved via any known method in the art. In one or more embodiments, mixing the electrolyte solution with impurities with a stripped organic solution comprises mixing in a mixing tank to provide an emulsion of the loaded organic solution and electrolyte solution with reduced impurities.

In some embodiments, after electrolyte solution is mixed with organic solution, the two phases are allowed to separate. For example, the loaded organic solution may be separated from the electrolyte solution with reduced impurities. Settling can be achieved via known methods in the art. In some embodiments, separating the loaded organic solution and electrolyte solution with reduced impurities in a settler.

An example of a circuit according to one or more embodiments of the invention is shown in the FIGURE. Refinery electrolyte is generated in refinery 100 by bringing in cast copper anodes (not shown) that contain impurities that must be removed to produce high grade copper. The copper anode is electroplated onto the cathode through a sulfuric acid electrolyte solution. As the anode is dissolved into the electrolyte, the impurities in the anode are liberated, soluble species remain in the electrolyte and insoluble species form a sludge at the bottom of the electrorefinery cell. A bleed stream of the electrolyte solution with impurities is taken from the electrorefinery. The electrolyte with impurities is the bleed stream of the refinery electrolyte to be treated for removal of impurities. In one or more embodiments, the aqueous solution is comprised of any typical electrorefinery solution made up of copper, acid and any amount of bismuth, antimony, tin and/or iron.

The bleed stream of electrolyte with impurities is pumped into an extraction mixing tank 110 where it is mixed with a stripped organic solution. The extraction mixing tank 110 can be a standard solvent extraction mixing tank similar to those used in copper solvent extraction. In several embodiments, the mixing system could be a single mixing tank with a mixer or multiple mixing tanks and mixers in series. During mixing in extraction mixing tank 110, the impurities in the electrolyte are transferred from the aqueous electrolyte phase into the stripped organic phase, which results in an emulsion of an electrolyte solution with reduced impurities and an organic phase loaded with impurities (i.e. loaded organic). This emulsion then overflows from the extraction mixing tank into the extraction settler 120. In the extraction settler 120, the phases are allowed to separate as they flow from the end of the tank near the mixing tank to the opposite end. Put in other words, the solutions enter one end of the tank from the extraction mixing tank and the phases separate as they flow from one end to the other, where underflow and overflow weirs allow the separate phases to be pumped to different locations. This is similar to those tanks used in copper solvent extraction plants.

After the phases have separated, the electrolyte with reduced impurities is pumped back to the refinery 100, where it is mixed with the bulk solution. The organic loaded with impurities is pumped to the strip mixing tank 130 where it is mixed with fresh strip solution. Strip mixing tank 130 may be a standard solvent extraction mixing tank similar to those used in copper solvent extraction. In one or more embodiments, strip mixing tank 130 comprises a single mixing tank with a mixer or multiple mixing tanks and mixers in series.

During this mixing, the impurities in the organic are transferred from the loaded organic to the fresh strip solution, which results in an emulsion of an aqueous strip solution containing impurities and a stripped organic. This emulsion overflows the strip mixing tank into the strip settler 140. In the settler, the phases are allowed to separate as they flow from the end of the tank near the mixing tank to the opposite end. The separation is achieved through via underflow and overflow weirs, which allow the separate phases to be pumped to different locations. In this respect, they may be similar to those tanks used in copper solvent extraction plants. After the phases have separated, the strip solution containing impurities is pumped back to the strip mixing tank 130 to be reused to strip more organic or it is pumped off for waste treatment and disposal. The stripped organic is then pumped back to the extraction mixing tank 110 to be reused again.

The stripped organic and the organic loaded with impurities is an organic phase may comprise an organic extractant(s), modifier(s) and diluent. The difference between stripped organic and organic loaded with impurities is the amount of impurities that are loaded into the organic phase. The organic phase composition can vary depending on application.

In one specific embodiment, the method comprises a. bleeding a stream of electrolyte solution with impurities from a copper refinery process, the electrolyte solution with impurities comprising an impurity metal selected from the group consisting of iron, antimony, arsenic, bismuth, tin and combinations thereof;

b. mixing in a mixing tank the electrolyte solution with impurities with a stripped organic solution to provide an emulsion comprising a loaded organic solution containing at least a portion of the impurities and electrolyte solution with reduced impurities, wherein the stripped organic solution comprises a phosphate ester having a structure represented by:

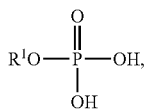

wherein $R^1$ comprises a linear, branched or cyclic alkyl or aryl group;

c. separating the loaded organic solution and electrolyte solution with reduced impurities in a settler;

d. returning the electrolyte with reduced impurities to the copper refinery process;

e. mixing in a mixing tank the loaded organic solution and a strip solution to provide an emulsion comprising a strip solution containing the impurity metal and stripped organic; and f. separating the strip solution containing the impurity metal and stripped organic.

Again, variations on the processes as described above may be applied here (e.g., phosphate ester choice, concentration, presence of solvents and/or diluents, etc.)

There are several advantages of one or more of the processes and/or systems described herein over other methods of impurity metal reduction. One such advantage is that one or more embodiments of the invention provide for a continuous process. Known processes that use resins cannot be carried out continuously, as the resins need to be regenerated after certain periods of use. Another benefit is that because one or more of the inventive methods described herein are much faster and use less reagent than previously known methods (e.g., precipitation), electrorefineries can obtain high purity copper more quickly.

EXAMPLES

Example 1

Initial testing used 42 g/L iso-octyl acid phosphate (Available from IsleChem, 32% w/w monoisooctyl and 67% w/w di-isooctyl) with isotridecanol (TDA) modifier in ShellSol D70. The feed solution was a synthetic electrolyte (35 g/L Cu and 160 g/L sulfuric acid in deionized water) spiked with 2 g/L Fe as ferric sulfate. The organic and aqueous feed solutions were contacted at an organic:aqueous (O:A) of 1:1 by volume in a 200 ml jacketed baffled beaker at 1750 RPM at 40° C. for at least 10 min. The resultant solutions were filtered through PS1 paper in the case of the organic phase and through Whatman #42 filter paper in the case of the aqueous to remove any entrainment and then saved for analysis. To test stripping an aliquot of the organic was contacted with a strip solution at an O:A 1:1 by volume by shaking in a separatory funnel on an automatic shaker at room temperature for 30 min. The resultant solutions were saved for analysis and filtered through appropriate filter paper to remove entrainment. Varying solutions were used to strip the loaded organic.

An organic phase consisting of 0.2M isooctyl acid phosphate (IOAP 67% diisooctyl hydrogen phosphate and 32% isooctyl dihydrogen phosphate manufactured by IsleChem) was made up in Shellsol D70 diluent (produced by Shell). Aqueous synthetic copper electrolyte solutions were made up containing 2 g/L iron, 35 g/L copper, 160 g/L sulfuric acid with one additional metal at varying amounts. An aqueous strip solution was made up using 400 g/L sulfuric acid.

The organic phase and aqueous synthetic copper electrolyte solutions were contacted at an O:A of 1:1, total volume 200 ml, in a jacketed baffled beaker at 1750 RPM at 40° C. for at least 10 min. The phases were allowed to separate. The aliquots of the organic phases were filtered through PS1 filter paper to remove aqueous entrainment and aliquots of the respective aqueous phases were filtered through Whatman #4 to remove organic entrainment. The resultant filtered samples were saved for further analysis. To test stripping, aliquots of the loaded organic samples were contacted with the strip solution by shaking at an O:A of 1:1 total volume 20 ml in a 30 ml separatory funnel on an automatic shaker at room temperature for 30 min. The resultant solutions, stripped organic and rich strip solution, were saved for analysis and filtered through the appropriate filter paper to remove entrainment. The starting electrolyte solutions, the electrolyte solutions after metal extraction and the aqueous strip solution used to strip the loaded organic were analyzed for metal content by atomic absorption spectroscopy.

TABLE 1

Co-extraction of iron and spiked metals from synthetic copper electrolyte

| Metal | % Extracted From Electrolyte | % Metal Recovered in Strip |
|---|---|---|
| Fe | 74% | 61% |
| As | 0% | 0% |
| Bi | 0% | 0% |
| Sb | 76% | 82% |
| Sn | 38% | 66% |

The second column of the above chart shows the percentage of each metal extracted from the synthetic electrolyte solutions from the first contact in this experiment. The third column shows what percentage of the metal could be stripped off of the organic during the second contact of this experiment, this is the percentage of the metal that was extracted from the electrolyte not the total in the electrolyte. The results of the experiment show that the iron, antimony and tin can be extracted from the electrolyte solution. The resultant loaded metals can then be stripped from the loaded organic.

Example 2

The same procedure from Experiment 1 was repeated however each aqueous solution did not contain iron and a different organic phase was used. The organic phase consisted of C12 alkylphenylphosphonic acid ("APPA," synthesized by BASF at APPA 90% purity) diluted to approximately 10% (volume/volume) in aromatic diluent. Aqueous electrolyte solutions were made up containing 35 g/L Cu, 160 g/L sulfuric acid with one additional metal at varying amounts. An aqueous strip solution was made up using 400 g/L sulfuric acid.

25 ml of organic was mixed with 25 ml of an electrolyte solution at 40° C. for 30 minutes. The electrolyte solution was removed and the loaded organic was then contacted with 25 ml of 400 g/L sulfuric acid for 30 min. The electrolyte prior to contact, after contact and the strip solution after contact were analyzed for metal content. The electrolyte solution was (160 gpl sulfuric acid 25 gpl Cu) spiked with a single metal.

TABLE 2

| g/L | % Extracted From Electrolyte | % Metal Recovered in Strip |
| --- | --- | --- |
| Fe | 8.6% | 76.4% |
| As | 0.9% | 11.8% |
| Bi | 12.1% | 77.4% |
| Sb | 2.6% | 29.1% |
| Sn | 50.9% | 100.0% |

The tin and arsenic results had poor calibration results (+−5%) so they are less accurate. All phase disengagements were clean except for tin which was slightly slower. The results indicate extraction of all metals except for arsenic. It also shows that the phosphonic acid is a more effective organic for the bismuth and less effective organic for antimony than is the isooctyl acid phosphate.

Example 3

Four organic phases were made up to test the extraction of these organics using a multi metal electrolyte. 500 ml of each organic was made. They were contacted once with 400 gpl sulfuric acid to wash the organics before use. The organics were formulated in Table 3 below:

TABLE 3

| Organic (SX-12) | gpl as received | | | |
| --- | --- | --- | --- | --- |
| | APPA | IOAP | TDA | TBP |
| 1 | 100 | | | |
| 2 | 100 | 100 | | |
| 3 | | 100 | | |
| 4 | | 50 | 50 | 50 |

APPA = C12 alkylphenyl phosphoric acid
IOAP = Isooctyl acid phosphate
TDA = Tridecanol
TBP = Tributyl phosphate The contacts were done at 50° C. in a 1 L jacketed baffled beaker. The contacts were O:A 1:1, aqueous continuous, 1750 RPM, 30 minutes. Between extraction and stripping the phases were separated in a separatory funnel and decanted. The contacts were a series of three extract then strip cycles where the same electrolyte solution was reused for each extraction contact but a fresh strip solution was used for each strip contact. The aqueous was electrolyte spiked with five metals (276 mV Ag/AgCl) in the same solution unlike Examples 1 and 2. The strip solution was 400 gpl sulfuric acid in DI water.

The break times for each contact were measured in organic and aqueous continuities. The break times showed that each organic had clean phase breaks except Organic 1 which formed an emulsion when mixed organic continuous.

TABLE 4

| Break Times (s) | 1 | 2 | 3 | 4 |
| --- | --- | --- | --- | --- |
| E Org | Emulsion | 104 | 94 | 36 |
| E Aq | 45 | 101 | 49 | 43 |
| S Org | Emulsion | 81 | 57 | 31 |
| S Aq | 45 | 121 | 60 | 37 |

Below are the Tables 5-8 containing the g/L metal values in each electrolyte, electrolyte after extraction and rich strip solution.

TABLE 5

| Organic 1 | % Extracted From Electrolyte | % Metal Recovered in Strip |
| --- | --- | --- |
| Fe | 6.5% | 100.0% |
| As | 0.0% | 0.0% |
| Bi | 3.0% | 100.0% |
| Sb | 11.7% | 100.0% |
| Sn | 39.5% | 40.0% |

TABLE 6

| Organic 2 | % Extracted From Electrolyte | % Metal Recovered in Strip |
| --- | --- | --- |
| Fe | 68.7% | 8.1% |
| As | 16.7% | 50.0% |
| Bi | 95.3% | 98.0% |
| Sb | 94.7% | 81.9% |
| Sn | 100.0% | 25.6% |

TABLE 7

| Organic 3 | % Extracted From Electrolyte | % Metal Recovered in Strip |
| --- | --- | --- |
| Fe | 81.3% | 2.6% |
| As | 7.1% | 100.0% |
| Bi | 95.2% | 100.0% |
| Sb | 95.9% | 38.7% |
| Sn | 97.6% | 0.0% |

TABLE 8

| Organic 4 | % Extracted From Electrolyte | % Metal Recovered in Strip |
|---|---|---|
| Fe | 39.2% | 54.1% |
| As | 0.0% | 0.0% |
| Bi | 29.3% | 100.0% |
| Sb | 85.3% | 100.0% |
| Sn | 92.7% | 44.7% |

It can be seen that little to no arsenic was extracted using these organics and conditions. Organics 2 and 3 had very good recovery of the other metals from the electrolyte, followed by Organic 4. Organic 1 was the weakest for these conditions but stripped readily except for tin at 40%. The ability to strip each metal varied for each organic. Iron stripped the best from Organic 4. Bismuth stripped well under each condition. Antimony stripped the best from Organic 4 and 2 and poorly from Organic 3. Tin had the lowest stripping but worked best from Organics 4 and 2.

From these results it can be seen that the varying of organic phases can be used to impact extraction and stripping of metals for removal. Also it can be seen that the extraction from multi metal spiked electrolyte behaved differently than the single metal spiked electrolytes.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method of reducing impurity metal from a refinery electrolyte solution, the method comprising contacting a refinery electrolyte solution comprising sulfuric acid and an impurity metal with a phosphate ester having a structure represented by:

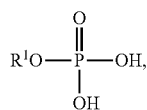

wherein $R^1$ comprises a linear, a $C_6$-$C_9$ branched or a cyclic alkyl or aryl group,
wherein the phosphate ester comprises iso-octyl phosphoric acid or a $C_{12}$ alkyl phenylphosphoric acid, and wherein the impurity metal is selected from the group consisting of iron, antimony, arsenic, bismuth, tin and combinations thereof.

2. The method of claim 1, further comprising contacting the refinery electrolyte solution comprising an impurity metal with a di-substituted phosphate ester.

3. The method of claim 1, further comprising contacting the electrolyte solution with a solubility modifier.

4. The method of claim 1, further comprising contacting the electrolyte solution with a kinetic modifier.

5. The method of claim 1, wherein the impurity metal is selected from the group consisting of bismuth, antimony, tin and combinations thereof.

6. The method of claim 1, further comprising: contacting the refinery electrolyte solution with a modifier.

7. The method of claim 1, wherein the stripped organic solution further comprises a di-substituted phosphate ester at a molar ratio of the phosphate ester to the di-substituted ester of about 20:1 to 0.1:1.

8. The method of claim 1, wherein the stripped organic solution further comprises a trialkyl phosphate ester is selected from the group consisting of tributyl phosphate, trihexyl phosphate ester, trioctyl phosphate ester, and tripentyl phosphate ester.

9. A method of reducing impurity metal from a refinery electrolyte solution, the method comprising:
a. bleeding a stream of electrolyte solution with impurities from a refinery process, the electrolyte solution with impurities comprising sulfuric acid and an impurity metal selected from the group consisting of iron, antimony, arsenic, bismuth, tin and combinations thereof; and
b. mixing the electrolyte solution with impurities with a stripped organic solution to provide a loaded organic solution containing at least a portion of the impurities and electrolyte solution with reduced impurities,
wherein the stripped organic solution comprises a phosphate ester having a structure represented by:

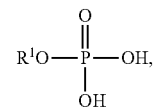

wherein $R^1$ comprises a linear, a $C_6$-$C_9$ branched or a cyclic alkyl or aryl group, and
wherein the phosphate ester comprises iso-octyl phosphoric acid or a $C_{12}$ alkyl phenylphosphoric acid.

10. The method of claim 9, further comprising mixing the loaded organic solution with a strip solution to provide a strip solution containing impurity metal and stripped organic.

11. The method of claim 10, wherein the stripped organic is mixed with fresh electrolyte solution with impurities.

12. The method of claim 10, wherein the strip solution containing the impurity metal is reused to be mixed with additional loaded organic solution.

13. The method of claim 9, further comprising returning the electrolyte solution with reduced impurities to the refinery process.

14. The method of claim 9, wherein mixing the electrolyte solution with impurities with a stripped organic solution comprises mixing in a mixing tank to provide an emulsion of the loaded organic solution and electrolyte solution with reduced impurities.

15. The method of claim 14, further comprising separating the loaded organic solution and electrolyte solution with reduced impurities in a settler.

16. The method of claim 9, further comprising: contacting the refinery electrolyte solution with a modifier.

17. The method of claim 9, wherein the stripped organic solution further comprises a di-substituted phosphate ester at a molar ratio of the phosphate ester to the di-substituted ester of about 20:1 to 0.1:1.

18. A method of reducing impurity metal from a refinery electrolyte solution, the method comprising:
   a. bleeding a stream of electrolyte solution with impurities from a copper refinery process, the electrolyte solution with impurities comprising sulfuric acid and an impurity metal selected from the group consisting of iron, antimony, arsenic, bismuth, tin and combinations thereof;
   b. mixing in a mixing tank the electrolyte solution with impurities with a stripped organic solution to provide an emulsion comprising a loaded organic solution containing at least a portion of the impurities and electrolyte solution with reduced impurities,
   wherein the stripped organic solution comprises a phosphate ester having a structure represented by:

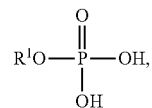

wherein $R^1$ comprises a linear, $C_6$-$C_9$ branched or cyclic alkyl or aryl group, wherein the phosphate ester comprises iso-octyl phosphoric acid or a $C_{12}$ alkyl phenylphosphoric acid;
   c. separating the loaded organic solution and electrolyte solution with reduced impurities in a settler;
   d. returning the electrolyte with reduced impurities to the copper refinery process;
   e. mixing in a mixing tank the loaded organic solution and a strip solution to provide an emulsion comprising a strip solution containing the impurity metal and stripped organic; and
   f. separating the strip solution containing the impurity metal and stripped organic.

19. The method of claim 18, further comprising: contacting the refinery electrolyte solution with a modifier.

20. The method of claim 18, wherein the stripped organic solution further comprises a di-substituted phosphate ester at a molar ratio of the phosphate ester to the di-substituted ester of about 20:1 to 0.1:1.

* * * * *